United States Patent [19]

Aldred et al.

[11] Patent Number: 5,265,404
[45] Date of Patent: Nov. 30, 1993

[54] REEL-TYPE GRASS CUTTING UNIT

[75] Inventors: Edward J. Aldred; John Mills, both of Ipswich, United Kingdom

[73] Assignee: Ransomes, Sims & Jefferies Limited, Ipswich, Great Britain

[21] Appl. No.: 915,827

[22] PCT Filed: Mar. 13, 1990

[86] PCT No.: PCT/GB90/00379
§ 371 Date: Jul. 28, 1992
§ 102(e) Date: Jul. 28, 1992

[87] PCT Pub. No.: WO90/10375
PCT Pub. Date: Sep. 20, 1990

[30] Foreign Application Priority Data

Mar. 13, 1989 [GB] United Kingdom ............... 8905759

[51] Int. Cl.⁵ .................... A01D 34/42; A01D 34/56
[52] U.S. Cl. ................................. 56/249.5; 56/16.7
[58] Field of Search ............... 56/7, 16.7, 249, 249.5, 56/253, 294, DIG. 20

[56] References Cited

FOREIGN PATENT DOCUMENTS

| 132517 | 5/1949 | Australia .................... 56/249.5 |
| 1017837 | 10/1957 | Fed. Rep. of Germany . |
| 3505225 | 8/1988 | Fed. Rep. of Germany . |
| 851769 | 1/1940 | France . |
| 526084 | 10/1989 | France . |
| 320957 | 10/1929 | United Kingdom . |
| 1270093 | 4/1969 | United Kingdom . |
| 1541426 | 2/1979 | United Kingdom ............... 56/249.5 |
| 2137062 | 10/1984 | United Kingdom . |
| 8102966 | 10/1981 | World Int. Prop. O. . |

Primary Examiner—David J. Bagnell
Attorney, Agent, or Firm—Browdy and Neimark

[57] ABSTRACT

A grass cutting unit with a reel rotatably mounted between side plates has bearing assemblies which extend inwardly of the side plates and a reel shaft shorter than the separation of the side plates. After removing one bearing assembly, the reel can be withdrawn transversely for maintenance. There is no necessity for open-ended slots in the side plates. A drive assembly is demountable as a unit with one bearing assembly. The opposite bearing assembly incorporates a spring loaded plunger to pre-load taper roller bearings in both assemblies.

11 Claims, 4 Drawing Sheets

REEL-TYPE GRASS CUTTING UNIT

This invention relates to grass cutting units of the type having a driven cutter reel cooperating with a stationary bottom blade and is more particularly, though not exclusively, concerned with such cutting units adapted to be mounted in groups of three or more on self-propelled or trailed grass cutting machines.

The conventional grass cutting unit comprises parallel side plates secured at opposite ends of a bottom block which provides the stationary bottom blade. The cutter reel has helical blades disposed about a reel shaft and the ends of this shaft project through apertures in the side plates for engagement with suitable bearings.

It is on occasion necessary to remove a cutter reel for maintenance or repair. Hitherto, this has often meant the removal of at least one side plate and this is a time consuming operation. Moreover, the re-assembly procedure will usually require tightening of bolts in a specified order and to specified torque levels, if undesirable stresses in the assembled unit are to be avoided. Whilst the assembly procedure can be accurately controlled at the time of manufacture, there is a risk that the correct procedures will not be followed during maintenance or repair work carried out in the field.

To avoid the necessity of removing one or more side plates, it has previously been proposed to form open ended slots in the side plates with the reel shaft being withdrawn through the slots. It is a problem, however, that the existence of open ended slots may significantly reduce the rigidity of the side plates, this rigidity being important in holding the reel and bottom blade in the correct cutting relationship.

It is one object of this invention to provide an improved grass cutting unit in which the correct positional relationship between the cutter reel and the bottom blade is accurately maintained and in which the cutter reel can be removed—for maintenance or repair purposes—without disassembly of the side plates.

Accordingly, the present invention consists in one aspect in a grass cutting unit comprising a transversely extending bottom block providing a bottom blade; a pair of generally parallel side plates secured to the bottom block at respective opposite ends thereof; a pair of bearing supports provided one on each side plate and each comprising a support bearing element, at least one of the bearing supports being removably secured to the associated side plate and having the bearing element thereof projecting inwardly of the side plate; and a cutter reel having a reel shaft and a plurality of blades rigidly disposed thereabout for cutting engagement with the bottom blade, wherein the reel shaft is provided at its ends with shaft bearing elements engaged respectively with the support bearing elements so as rotatably to support the cutter reel between the side plates, characterised in that the length of the reel shaft is less than the transverse separation of the side plates such that upon removal of said at least one bearing support, the cutter reel may be withdrawn from the side plates in a direction normal to the shaft length.

Advantageously, both bearing supports are removably secured to the associated side plate and have the bearing element thereof projecting inwardly through an aperture in that side plate.

Preferably, each support bearing element comprises a bearing collar and each shaft bearing element comprises a shaft portion extending within the respective bearing collar.

Suitably, a taper roller bearing is provided between each bearing collar and the corresponding shaft portion.

The use of taper roller bearings is generally preferred for the mounting of cutter reels since they can be adjusted to eliminate radial clearance and have, for a comparable size, a longer life than most other bearing types. A disadvantage of taper roller bearings in this application is that the relative positions of the coned faces within the bearing must be accurately maintained if the correct relationship is to be assured between the cutter reel blades and the stationary bottom blade. It has been found that the sweeping engagement between the helical blades of the cutter reel and the stationary bottom blade, applies an axially directed force between the cutter reel and the bottom block/side plates assembly. The taper roller bearings must accordingly be preloaded to withstand this axial force; too high a preload will, however, cause the bearings to run at elevated temperature with a consequent reduction in bearing life.

It is an object of one form of this invention to provide an improved grass cutting unit which utilises taper roller bearings and in which these difficulties of bearing adjustment are substantially overcome.

Accordingly, in one form of the present invention a bearing is provided between each said support bearing element and the corresponding shaft bearing element, each bearing comprising radially inner and outer bearing member, and spring biasing means are provided on one side plate to act between that side plate and one adjacent bearing members so as to urge relative axial displacement of the bearing members in a direction tending to decrease radial clearance between the bearing members.

Preferably, said axial displacement is transmitted through the cutter reel shaft so as to urge relative axial displacement between the bearing members of the opposite bearing in a direction as to reduce radial clearance within that opposite bearing.

Advantageously, said spring biasing means is provided with a fixed stop which provides a reaction for the spring biasing force once a pre-set axial displacement limit has been exceeded.

Suitably, each said bearing comprises a taper roller bearing with said inner and outer members comprising respective inner and outer bearing cones.

It is common for grass cutting units of the type described to be driven by individual hydraulic motors. In some cases, the hydraulic motor is mounted at one end of the cutting unit and provides an essentially direct drive to the cutter reel shaft. In this arrangement, the hydraulic motor can accompany the cutting unit as it is removed from the machine, although the hydraulic connections to the motor must necessarily be broken. If this operation is to be performed quickly and without risk of leakage or the introduction of foreign matter into the hydraulic system, relatively expensive connecting elements and valves must be provided. In the case where a motor is mounted separately from the cutting unit, removal of the cutting unit will necessitate disassembly of the belt or other drive connection between the motor and the cutter reel shaft. This can be time consuming.

It is one object of still a further form of this invention to provide a cutter reel drive assembly which is carried on but readily removable from the grass cutting unit.

3

It is a further object to provide a drive assembly which can be produced and tested as a functional entity, independently of the grass cutting unit.

Accordingly, the present invention consists, in still a further aspect, in a grass cutting unit comprising a transversely extending bottom block providing a bottom blade; a pair of generally parallel side plates secured to the bottom block at respective opposite ends thereof; a cutter reel having helical blades positioned for cooperation with the bottom blade and a shaft rotationally mounted in the side plates; with a drive formation at one end of the shaft and a motor drive assembly for driving the cutter reel shaft, wherein the motor drive assembly comprises a drive housing; an intermediate drive element rotationally supported within the drive housing and provided with a projecting drive formation engagable with said shaft drive formation; a motor carried on the housing and transmission means in the drive housing operatively connected between the motor and the drive element, and wherein one side plate of the grass cutting unit is so adapted that the motor drive assembly can be mounted thereon and removed therefrom without disconnection of said transmission means.

Advantageously said projecting drive formation is shaped as a push fit with a complementary drive formation on the cutter reel shaft.

The invention will now be described by way of example with reference to the accompanying drawings in which.

Figure 1:
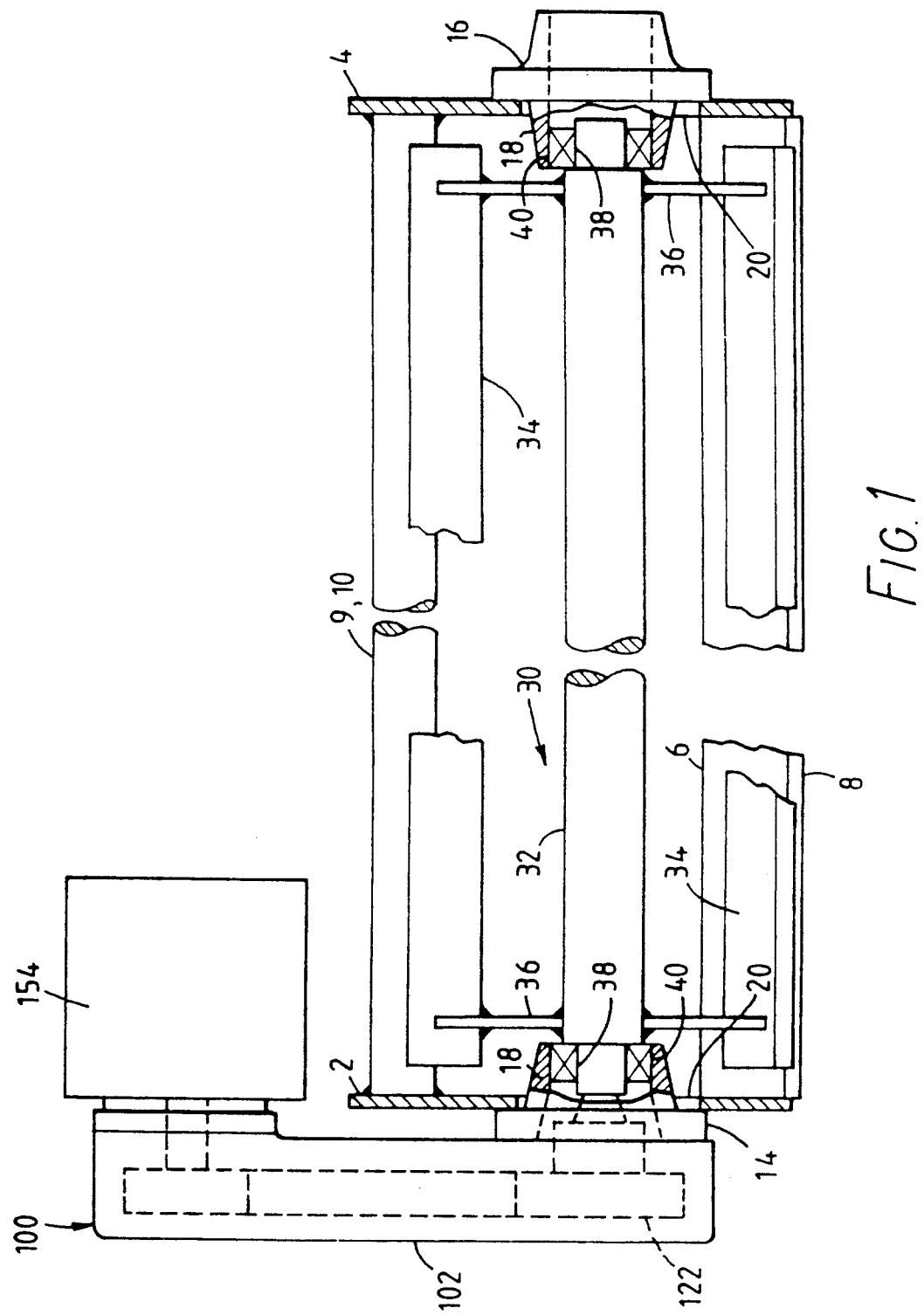
FIG. 1 is a somewhat diagrammatic part-sectional view of a grass cutting unit according to this invention.

Referring initially to FIG. 1, the grass cutting unit comprises a pair of parallel side plates 2, 4 between which extends a bottom block 6 of angle section. To the underside of the bottom block 6 there is secured a bottom blade 8. The two side plates 2, 4 are further connected by forward and rear connecting rods 9 and 10 respectively.

Figure 4:
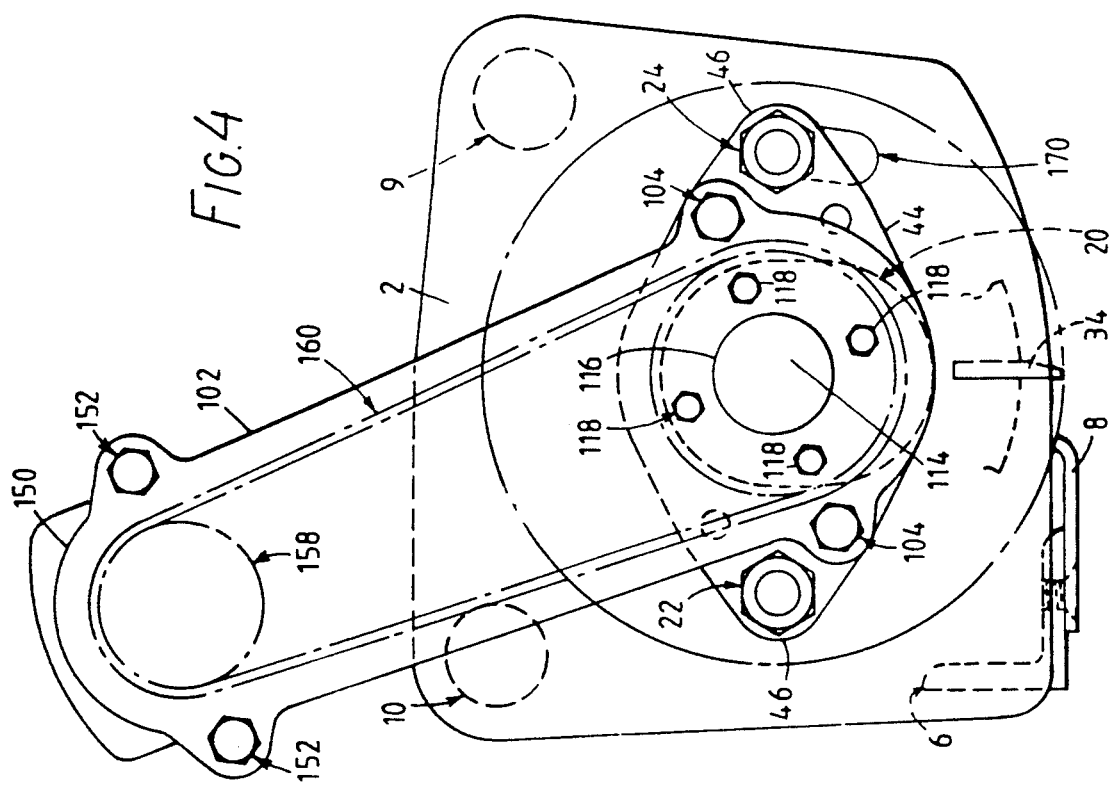
FIG. 4 is an end view of the grass cutting unit shown in FIGS. 2 and 3.

The side plates 2, 4 carry respective bearing housings 14, 16. Each bearing housing provides an integral bearing collar 18 which projects inwardly through an aperture 20 in the associated side plate. Each bearing housing 14, 16 is bolted to the corresponding side plate 2, 4 with (as seen in FIG. 4) bolts 22, 24.

The cutting unit further comprises a cutter reel 30 having a shaft 32. Helical blades shown schematically at 34 are mounted on the shaft through supports 36, in a generally conventional manner. At each end of the shaft 32, there is provided a spigot 38 of reduced diameter. The spigots project within the bearing collars 18 of the respective bearing housings 14 and 16 and are supported by bearings shown generally at 40.

At the left hand end of the cutting unit, there is provided a drive assembly shown generally at 100. This composes a drive housing 102, which is supported on the bearing housing 14, and a drive motor 154. In a manner which will be described in more detail hereafter, drive is transmitted from the motor 154 to the cutter reel shaft 32 via an intermediate drive element 122.

4

Figure 2:
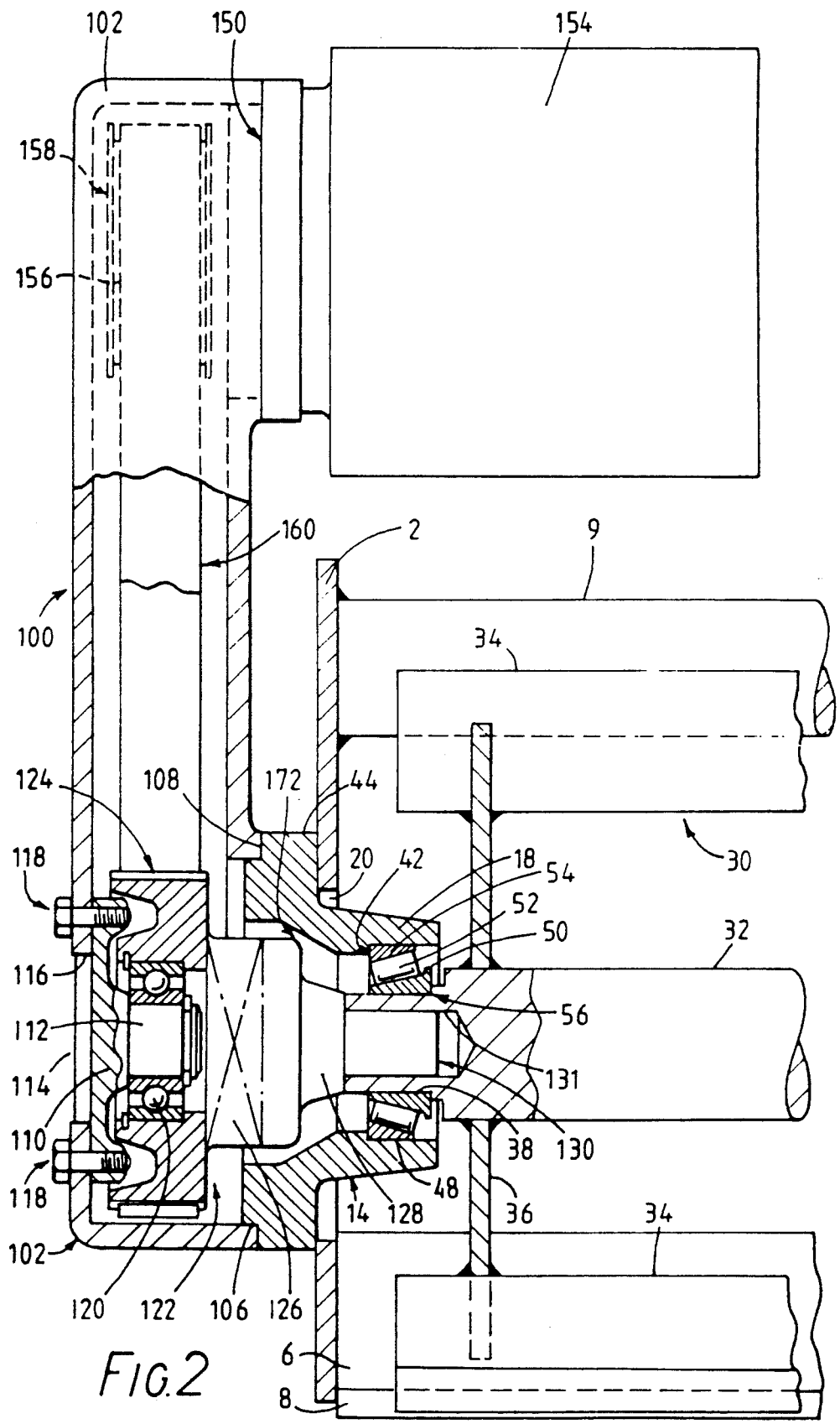
FIG. 2 is a view to an enlarged scale and partly in section of the left hand end of a grass cutting unit of FIG. 1.
Figure 3:
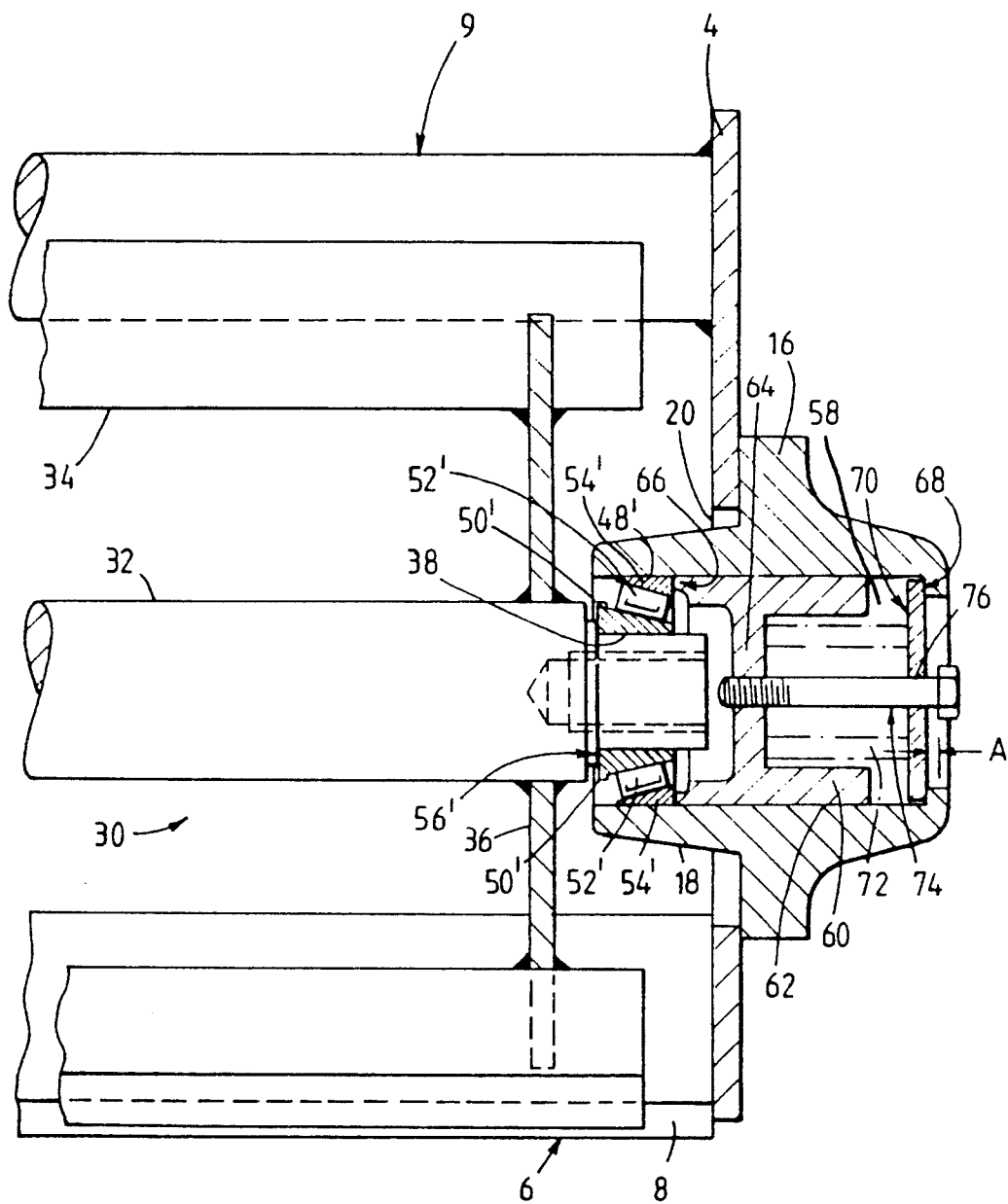
FIG. 3 is a view similar to FIG. 2 of the right hand end of the same grass cutting unit.

Referring now to FIG. 2, the bearing housing 14 at the left hand end of the cutter unit 42 (as seen in FIG. 1) is generally of hollow cylindrical form. There is provided integrally with the bearing collar 18, a shoulder 42 and a mounting flange 44 provided with ears 46 to receive the bolts 22 and 24. The interior of the bearing collar 18 provides a cylindrical bearing surface 48 which is bounded in the axially outward direction by the shoulder 42. Between this cylindrical bearing surface 48 and the spigot 38 at the left hand end of the cutter reel shaft, the described bearing 40 takes the form of a generally conventional. This comprises an radially inner bearing cone 50, rollers 52 and an outer bearing cone 54. The outer bearing cone 54 abuts the shoulder 42 of the bearing collar whereas the inner bearing cone 50 abuts a shoulder 56 formed between the spigot 38 and the main section of the cutter reel shaft 32.

The drive housing 102 is secured to the bearing is secured to the bearing housing 14 with bolts 104, and has a circular opening 106 which engages a rim 108 formed on the bearing housing 14. Within the drive housing 102 and opposing the bearing housing 14, there is secured a plate 110 carrying an integral stub shaft 112. The stub shaft 112 is arranged co-axially with the reel shaft 32 and from the opposite face of the plate 110 there extends a co-axial locating disc 114. This disc 114 is received within an aperture 116 in the drive housing 102 and the plate 110 is held in place by four bolts 118 which extend inwardly through the drive housing 102 to be received in the plate 110.

A roller bearing 120 provided on the stub shaft 112 provides a rotational mounting for an intermediate drive element 122. This element is disposed on the axis of the cutter reel shaft and comprises a belt pulley 124 secured through a flexible coupling 126 to a shaft drive member 128. The drive member 128 is formed with a splined shaft 130 which is received as a sliding fit within a splined bore 131 provided in the end of the cutter reel shaft 32.

Remotely from the bearing housing 14, the drive housing 102 provides a mounting through ring 150 and bolts 152 for the hydraulic drive motor 154. The driven shaft 156 of the motor 154 carries a belt pulley 158 and a drive belt 160 extends between that pulley and the pulley 124 of the intermediate drive element 122.

It will be seen from the drawings that the apertures 20 in the respective side plates are elongated along an arc centred on bolt 22. Bolt 24 is received within an arcuate slot 170 in the side plate 2.

By slackening bolts 22 and 24 and rotating each bearing housing in relation to the corresponding side plate, the correct working relationship can be established between the helical blades 34 and the stationary bottom blade 8. It will be observed that since the drive assembly 100 is carried upon the bearing housing 14, the tension in belt 160 is not effected by this adjustment. During this adjustment, flexible coupling 126 enables the splined shaft 130 to follow any departure of the cutter reel shaft 32 from precise axial alignment.

At the right hand end of the cutting unit, the bearing housing 16 has an internal bore 58 which is a continuation of the cylindrical bearing surface 48' within the bearing collar 18. A plunger 60 is mounted within the bearing housing and has a cylindrical flange 62 slidably engaged within the bore 58 and an integral disc portion 64. The front edge 66 of the flange 62 serves as a retaining step for the outer bearing cone 54' of a taper roller bearing which is identical with that provided at the opposite end of the reel shaft. Thus, an inner bearing cone 50' is mounted on the spigot 38 provided at the reel shaft end and located against shoulder 56', with rollers 52' disposed between the inner and outer bearing cones.

At the axially outer end of the bearing housing 16, the internal bore 58 has an inwardly directed lip 68. This serves to retain a reaction disc 70 and there is disposed between this reaction disc 70 and the plunger disc portion 64 a substantial compression spring 72. A bolt 74 extends with clearance through an aperture 76 in the reaction disc and passes along the length of the compression spring 72 to be screw threadably received within the plunger disc portion 64.

In the position shown in the drawing, which is the working position, there is a clearance A between the head of bolt 74 and the reaction disc 70. The plunger 60 is thus biased towards the taper roller bearing by the compression spring 72. In more detail, the spring biasing force is applied to the outer bearing cone 54' with the reaction (after any radial clearance has been taken up) arising through the abutment of the inner bearing cone 50' on the shoulder 56' of the reel shaft. The consequent tendency of the reel shaft to move to the left (as shown in the drawing) is taken up through the abutment of the shoulder 56 at the opposite end of the shaft upon inner bearing cone 50 and through the bearing itself to shoulder 42 on the bearing housing 14.

It will be recognised that the described arrangement enables an accurately determined pre-load to be applied to the two taper roller bearings.

During initial assembly of the unit and on the occasions where it is subsequently necessary to remove the bearing housings, the bolt 74 serves the useful purpose of containing the spring energy. Thus once an axial displacement in excess of the clearance A has taken place, the bearing assembly exerts no further biasing force.

When the cutting reel 30 has to be removed from the described cutting unit, bolts 22 and 24 are removed and each bearing housing 14, 16 is withdrawn in the axial direction. Since the length of the cutter reel shaft 32 is less than the separation of the two side plates 2, 4, the cutting reel 30 can then be lifted from the unit in a direction normal to the shaft length. This removal procedure can be carried out relatively quickly and does not disturb the structure formed by the two side plates 2, 4, the bottom block 6 and the connecting rods 9 and 10.

Since the drive assembly 100 is mounted upon the bearing housing 14, it does not have to be dis-assembled during this procedure and is simply removed as a unit with the bearing housing. In the axial separation of the bearing housing 14 from the cutter reel shaft, the splined shaft 130 slides out of the bore 40. Engagement between inclined surface 172 of the bearing housing 14 and the drive member 128 serves to maintain the intermediate drive element 122 in proper engagement with the bearing 120, during this displacement.

As the bearing housing 16 is removed, the energy of spring 72 is, as mentioned before, contained by bolt 74. On re-assembly, the correct pre-load is automatically re-applied as bolts 22, 24 are tightened and clearance A re-established.

The drive assembly 100 can be removed from the cutting unit simply by unfastening bolts 104. The removal of the drive assembly does not affect the setting of the cutting reel relative to the bottom blade since bearing housing 14 remains firmly clamped to side panel 2.

It should be recognised that the provision of a drive assembly as a self-contained unit has important advantages in the assembly and storage of grass cutting units. Thus cutting units can be assembled initially without drive assemblies with an appropriate drive assembly (which may have been tested as a functioning entity in a dummy cutting unit) added at a subsequent stage. In the field, neither removal of the cutting unit from the grass nor separation of the drive from the cutter reel requires the breaking of any hydraulic connection or disturbance of any element of the transmission—apart from the final "plug-in" connection to the cutter reel shaft. It should be noted that a splined bore 131 is provided at both ends of the cutter reel shaft to avoid the necessity to distinguish left handed and right handed cutter reels.

Figure 5:
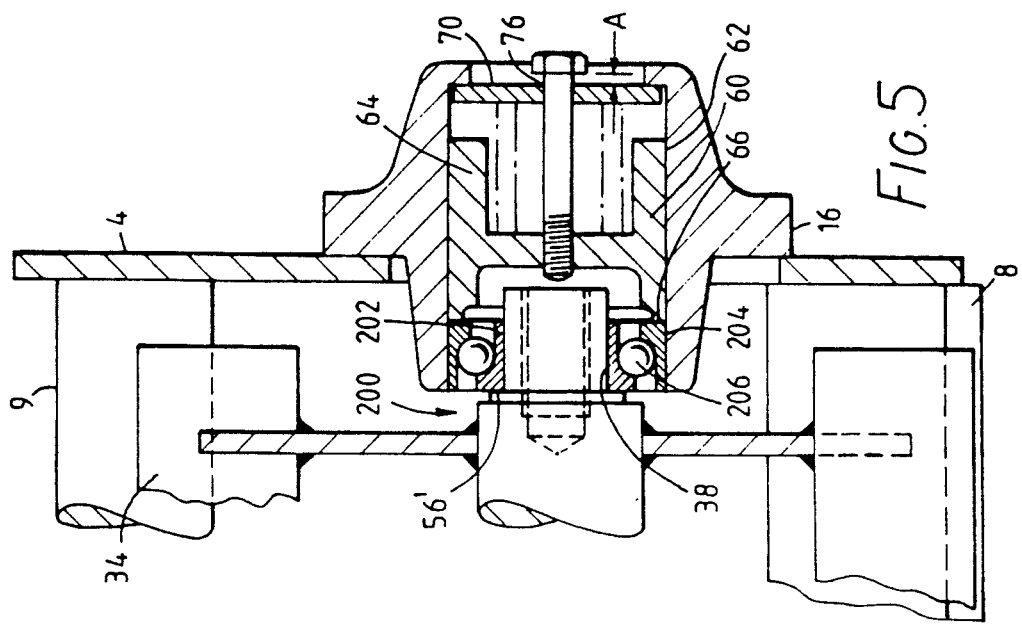
FIG. 5 is a view similar to FIG. 3, illustrating a modification.

Referring now to FIG. 5, there is illustrated a modification in which the taper roller bearing of the previously described embodiment is replaced by an angular contact bearing 200. Other components remain unchanged and the same reference numerals have been used.

The bearing 200 comprises an inner bearing 202 mounted on the reel shaft spigot 38 and abutting shoulder 56'. The outer bearing ring 204 abuts the front edge 66 of flange 62 and, between the inner and outer rings, there are disposed ball bearings 206.

An identical bearing is provided at the opposite end of the cutter reel shaft. As with the previously described taper roller bearings, it is essential that the correct axial load be applied to the two angular contact bearings 200. For this purpose, the plunger 60 operates in a manner analogous to that described above.

It will be apparent to the skilled man that a variety of further bearing types can be employed which are capable of separation on removal of the bearing housings 14, 16. An axial pre-load mechanism will be required with some but not necessarily all such further bearing types.

There has been described an improved grass cutting unit having a number of important advantages. With the length of the cutter reel shaft being less than the separation between the side plates of the unit and with each bearing housing projecting inwardly of the corresponding side plate, a simple procedure has been provided for removal of the cutter reel in a direction normal to the reel length with no necessity for open ended slots in the side plates. It will be recognised that the described bearing collar cooperating with a spigot on the reel shaft end could be replaced by other combinations of bearing elements with a first of these bearing elements provided on the bearing housing or other bearing support projecting inwardly of the side plate. In a further modification, such an arrangement may be provided at one end only of the cutter reel with sufficient clearance being provided between the ends of the cutter reel shaft and the side plates to allow for axial disengagement of the bearing at the opposite end prior to withdrawal of the cutting reel in a direction normal to its length.

The described use of a spring loaded plunger to apply an accurate and controlled pre-load to the taper roller bearings is believed to avoid many of the disadvantages that had previously attached to the use of taper roller and other separable bearings. This feature is regarded as being of benefit even where the bearing supports do not project inwardly of the side plates to permit ready withdrawal of the cutter reel as described above. The biasing of the bearings could of course be achieved in a variety of means and, in a case where axial displacement of the cutter reel shaft is restrained, separate biasing means can be provided for each bearing. In further alternative arrangements, the inner rather than the outer bearing cone or may be contacted by the spring biasing means and other forms of spring employed. The use of a fixed stop which provides a reaction for the spring biasing force, once a pre-set axial displacement limit has been exceeded, is regarded as highly desirable—but not necessarily essential.

The advantages of a self-contained drive assembly have been set out above and it is believed that these advantages could remain important in an arrangement which does not involve the described biasing of the bearings nor the ready removal of the cutting reel. It should be recognised that the drive assembly need not incorporate a belt, and alternative transmission means may be provided in the drive housing to form an operative connection between a hydraulic or other motor provided on the drive housing and an appropriate intermediate drive element rotationally supported within the drive housing.

We claim:

1. A grass cutting unit comprising a transversely extending bottom block providing a bottom blade; a pair of generally parallel side plates secured to the bottom block at respective opposite ends thereof; a pair of bearing supports provided one on each side plate and each comprising a support bearing element, at least one of the bearing supports being removably secured to the associated side plate and having the bearing element thereof projecting inwardly of the side plate; and a cutter reel having a reel shaft and a plurality of blades rigidly disposed thereabout for cutting engagement with the bottom blade, wherein the reel shaft is provided at its ends with shaft bearing elements engaged respectively with the support bearing elements so as rotatably to support the cutter reel between the side plates, characterised in that the length of the reel shaft is less than the transverse separation of the side plates such that upon removal of said at least one bearing support, the cutter reel may be withdrawn from the side plates in a direction normal to the shaft length.

2. A cutting unit according to claim 1, wherein both bearing supports are removably secured to the associated side plate and have the bearing element thereof projecting inwardly throught an aperture in that side plate.

3. A cutting unit according to claim 1, wherein, each shaft bearing element comprises a shaft portion extending within the respective bearing support.

4. A cutting unit according to claim 3, wherein a taper roller bearing is provided between each bearing collar and the corresponding shaft portion.

5. A cutting unit according to claim 1, further comprising a drive housing secured to said one removable bearing support, an intermediate drive element rotationally supported within the drive housing and provided with a projecting drive formation, a motor carried on the drive housing and transmission means in the drive housing interconnecting the motor and intermediate drive element, wherein the corresponding end of the cutter reel shaft is shaped for driving engagement with said projecting drive formation, the drive housing being removable as a unit with said bearing support.

6. A cutting unit according to claim 1 wherein a bearing is provided between each said support bearing element and the corresponding shaft bearing element each bearing comprising radially inner and outer bearing members and wherein spring biasing means are provided on at least one side place to act between that side plate and one adjacent bearing member so as to urge relative axial displacement of the bearing members in a direction tending to decrease radial clearance between the bearing members.

7. A cutting unit according to claim 6, wherein said axial displacement is transmitted through the cutter reel shaft so as to urge relative axial displacement between the bearing members of the opposite bearing in a direction as to reduce radial clearance within that opposite bearing.

8. A cutting unit according to claim 6, wherein said spring biasing means is provided with a fixed stop which provides a reaction for the spring biasing force once a pre-set axial displacement limit has been exceeded.

9. A cutting unit according to claim 6 wherein said spring biasing means comprises a plunger slidably mounted in the corresponding bearing support and a spring acting between the plunger and the bearing support to slide the plunger axially inward.

10. A cutting unit according to claim 6, wherein each said bearing comprises a taper roller bearing with said inner and outer members comprising respective inner and outer bearing cones.

11. A grass cutting unit comprising a transversely extending bottom block providing a bottom blade; a pair of generally parallel side plates secured to the bottom block at respective opposite ends thereof; a cutter reel having helical blades positioned for cooperation with the bottom blade and a shaft rotationally mounted in the side plates with a drive formation at one end of the shaft; and a motor drive assembly for driving the cutter reel shaft, wherein the motor drive assembly comprises a drive housing; an intermediate drive element rotationally supported within the drive housing and provided with a projecting drive formation engagable with said shaft drive formation; a motor carried on the housing and transmission means in the drive housing operatively connected between the motor and the drive element, and wherein one side plate of the grass cutting unit is so adapted that the motor drive assembly can be mounted thereon and removed therefrom without disconnection of said transmission means.

* * * * *